United States Patent
Shobayashi

(10) Patent No.: US 6,665,617 B2
(45) Date of Patent: Dec. 16, 2003

(54) GROUND ANALYZING SYSTEM AND RECORDING MEDIUM RECORDING ANALYSIS PROGRAM USED THEREFOR

(75) Inventor: Shigenori Shobayashi, Tokyo (JP)

(73) Assignee: Vibration Instruments Co., Ltd., Tokyo (JP)

(*) Notice: Subject to any disclaimer, the term of this patent is extended or adjusted under 35 U.S.C. 154(b) by 0 days.

(21) Appl. No.: 10/152,287

(22) Filed: May 21, 2002

(65) Prior Publication Data

US 2002/0193952 A1 Dec. 19, 2002

(30) Foreign Application Priority Data

May 22, 2001 (JP) ........................................ 2001-151961

(51) Int. Cl.⁷ .............................. G01V 1/00; G01V 1/28
(52) U.S. Cl. ...................................................... 702/14
(58) Field of Search .............................. 702/14, 18, 56, 702/66, 76, 77, 125, 126, 149, 158, 127; 73/597; 181/122; 367/38, 48

(56) References Cited

U.S. PATENT DOCUMENTS

| | | | | |
|---|---|---|---|---|
| 4,750,157 A | * | 6/1988 | Shei | 367/47 |
| 4,933,911 A | * | 6/1990 | Sondergeld et al. | 367/13 |
| 5,243,565 A | * | 9/1993 | Yamamoto | 367/131 |
| 5,490,062 A | * | 2/1996 | Leach et al. | 702/15 |
| 5,642,327 A | * | 6/1997 | Schiflett et al. | 367/47 |
| 6,253,870 B1 | * | 7/2001 | Tokimatsu et al. | 181/122 |
| 6,536,553 B1 | * | 3/2003 | Scanlon | 181/108 |

* cited by examiner

Primary Examiner—John Barlow
Assistant Examiner—Demetrius Pretlow
(74) Attorney, Agent, or Firm—Collard & Roe, P.C.

(57) ABSTRACT

Two acceleration detectors (11A and 11B) are dispose at a distance L from each other on the ground. A vibration exciter (15) vibrates the surface of the ground in the vertical direction to generate surface waves. A measuring instrument (12) includes a seismometer unit (12-1) for receiving detection signals from the two acceleration detectors to generate acceleration time-series signals, which are analog, and an A/D converter unit (12-2) for converting the analog acceleration time-series signals into digital acceleration time-series signals. The measuring instrument is connected to a personal computer (13) for receiving the time-series signals and then processing the signals on the basis of a predetermined analysis program, thereby calculating a mean propagation velocity $V_r(f)$ and a depth $D(f)$.

8 Claims, 8 Drawing Sheets

GROUND ANALYZING SYSTEM AND RECORDING MEDIUM RECORDING ANALYSIS PROGRAM USED THEREFOR

BACKGROUND OF THE INVENTION

The present invention relates to a ground analyzing system utilizing the characteristics of surface waves, particularly, Rayleigh waves.

In ground analysis performed in constructing the foundations of buildings, tunnels, and the faces of slope, geophysical analyzing methods have been used in many cases. Among the geophysical analyzing methods, particularly, an elastic wave analyzing method has been known as a method for quantitatively grasping the geotechnical properties of the ground. As representative elastic wave analyzing methods, a method using refracted waves and a method using direct waves have been known. According to the method using the refracted waves, the geotechnical properties of the ground are extensively grasped. According to the method using the direct waves, the geotechnical properties of the ground are locally grasped. The method using direct waves utilizes a boring hole. Both the methods use P waves and S waves called body waves among elastic undulation generated from a vibration source. The P waves are also called compression waves while the S waves are also called shear waves. Those waves are properly used in consideration of geological conditions.

Other than the P waves and the S waves, waves called surface waves have been known. It has also been known that the surface wave accompanies with a dispersing phenomenon and has such properties that the propagation velocity thereof depends on the wavelength thereof.

The properties of the surface wave will now be described hereinbelow in brief. When a vibration source applies a vibration to the surface of the ground in the vertical direction, waves called the surface waves occur in the ground in addition to the P waves and the S waves. The P waves and the S waves propagate hemispherically from the vibration source. On the other hand, Rayleigh waves among the surface waves propagate so as to extend the diameter of a cylinder having a predetermined height defined by a frequency. In other words, each of the P wave and the S wave generated from the vibration source has the directivity. The P wave traveling below the vibration source has the maximum energy. The S wave traveling in the direction of 45° has the maximum energy. In other words, the P wave and the S wave hardly transmit in the horizontal direction. Consequently, only the surface wave can apply the large amplitude of the vibration to the surface of the ground.

The geometrical attenuation coefficient of each of the P wave and the S wave denotes $r^{-1}$ (r indicates a distance) in the lower direction but the geometrical attenuation coefficient thereof denotes $r^{-2}$ in the vicinity of the ground surface.

On the other hand, the geometrical attenuation coefficient of the surface wave denotes $r^{-0.5}$ on the surface of the ground. In addition to the Rayleigh waves, the surface waves include Love waves, P-P mode waves similar to the P waves, and plate waves. In the present invention, the Rayleigh waves are used.

FIG. 1 shows the relationship between the velocities of the Rayleigh wave, the P wave, and the S wave. Three types of velocity ratios vary depending on the Poisson's ratio of soil comprising the ground. The velocity of the S wave denotes a value that is approximate to that of the Rayleigh wave. Referring to FIG. 1, the axis of ordinates denotes a value expressed by an equation of $V/V_s = V \cdot (\rho/G)^{1/2}$. Reference symbol $V_s$ denotes the velocity of the S wave, reference symbol $\rho$ denotes the density of soil, reference symbol G indicates the modulus of rigidity, and reference symbol V indicates the velocity of the P wave or the Rayleigh wave.

Since the velocity of the Rayleigh wave is approximate to that of the S wave and typically denotes a geotechnical value, the respective geotechnical values of the S wave and the Rayleigh wave can be estimated using a correlation equation between the velocity of the S wave and an N value (standard penetration test value) or a correlation equation between the velocity of the S wave and a $q_a$ value (allowable bearing capacity).

SUMMARY OF THE INVENTION

On the basis of the above-mentioned findings, it is an object of the present invention to provide a ground analyzing system, which can perform a nondestructive, accurate, rapid, and economical analysis using the dispersing properties of surface waves, particularly, Rayleigh waves.

A ground analyzing system according to the present invention is for carrying out ground analysis by detecting surface waves generated by vibrating the surface of the ground in the vertical direction. According to an aspect of the present invention, the ground analyzing system includes: first and second acceleration detectors disposed at a distance L from each other on the ground; a measuring instrument including a seismometer unit for receiving detection signals from the first and second acceleration detectors to generate first and second acceleration time-series signals; and a signal processing unit for receiving the first and second acceleration time-series signals to perform a signal processing based on a predetermined analysis program. The signal processing unit performs Fourier transform to calculate power spectra and a cross spectrum and also calculates a transfer function H(f) using the calculated power spectrum and cross spectrum. The signal processing unit also calculates a phase difference $\Delta\theta(f)$ between the first and second acceleration time-series signals and a time difference $\Delta t(f)$ therebetween using the calculated transfer function. The signal processing unit further calculates a mean propagation velocity $V_r(f)$ of the surface waves and a depth D(f) on the basis of the calculated time difference $\Delta t(f)$ and the distance L.

According to the present invention, there is provided a recording medium which has recorded an analysis program for processing first and second acceleration time-series signals obtained by detecting surface waves, generated by vibrating the surface of the ground in the vertical direction, at two points arranged at a distance from each other. According to the present invention, the recording medium has recorded the analysis program for executing the steps of: performing Fourier transform to the first and second acceleration time-series signals to calculate power spectra and a cross spectrum; calculating a transfer function H(f) using the calculated power spectrum and cross spectrum; calculating a phase difference $\Delta\theta(f)$ between the first and second acceleration time-series signals and a time difference $\Delta t(f)$ therebetween on the basis of the calculated transfer function H(f); and calculating a mean propagation velocity $V_r(f)$ of the surface waves and a depth D(f) on the basis of the calculated time difference $\Delta t(f)$ and the distance L.

DESCRIPTION OF THE PREFERRED EMBODIMENT

Figure 1:
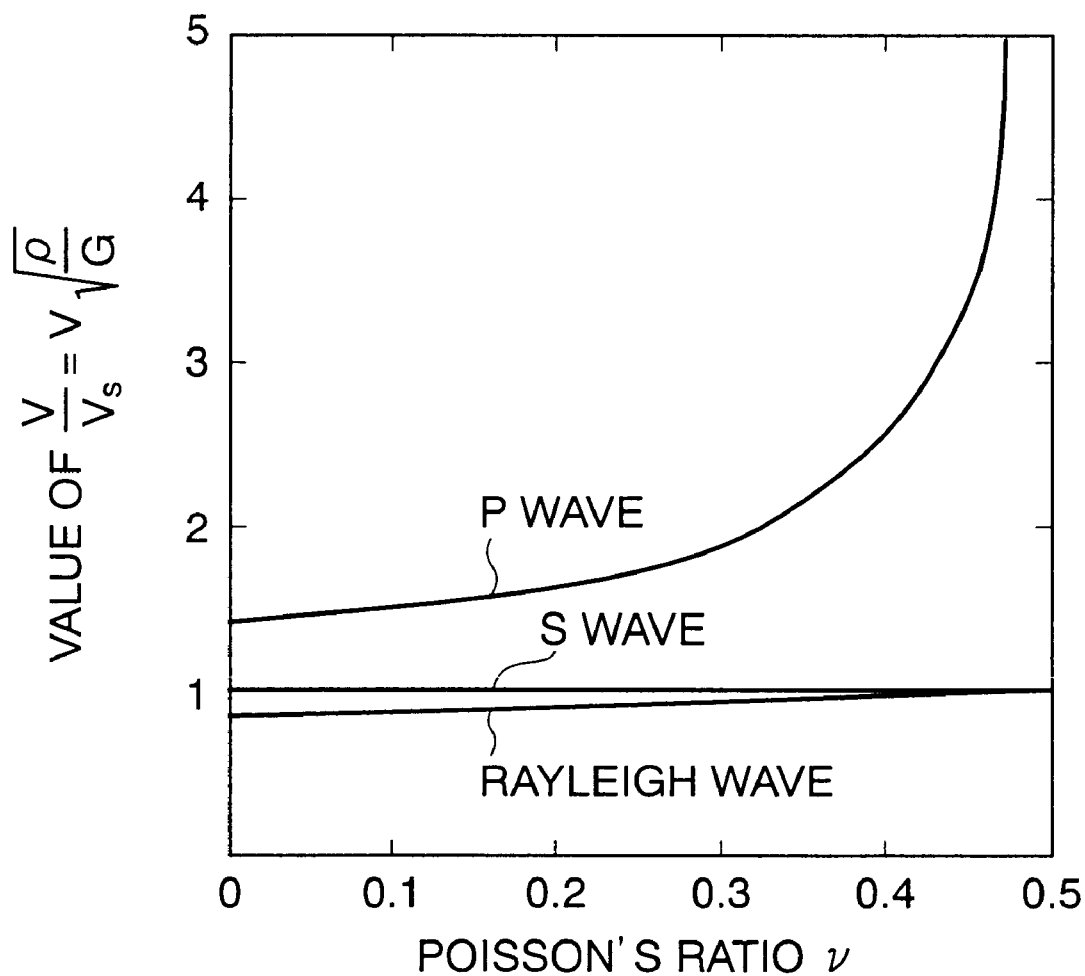
FIG. 1 is a characteristic graph showing the relationship between propagation velocities of P waves, S waves, and Rayleigh waves and the Poisson's ratio of a semiinfinite elastic body.
Figure 2:
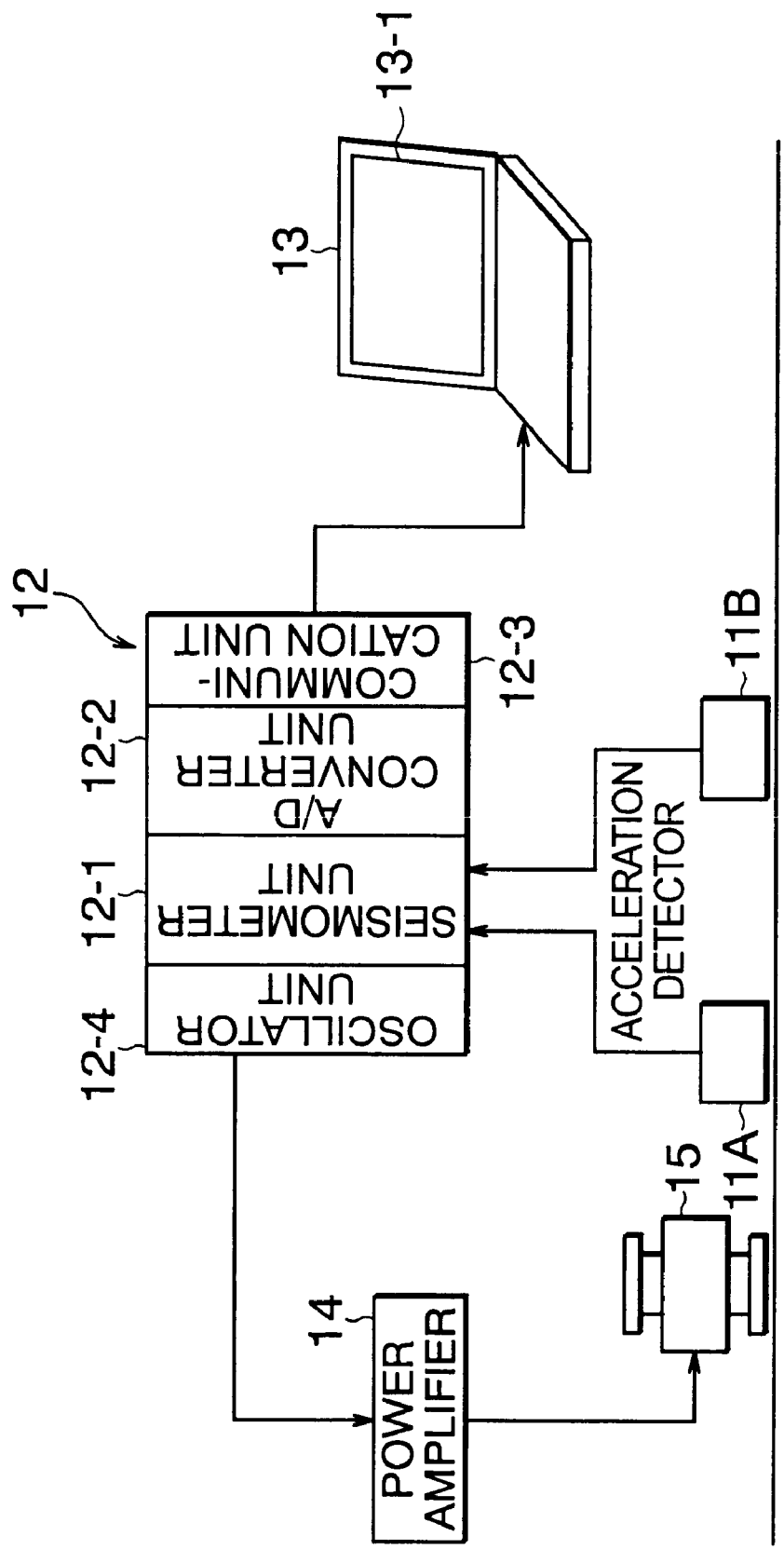
FIG. 2 is a diagram showing a configuration of a ground analyzing system according to a preferred embodiment of the present invention.

According to a preferred embodiment of the present invention, a ground analyzing system will now be described with reference to FIG. 2. In FIG. 2, the present system includes first and second acceleration detectors 11A and 11B and a measuring instrument 12 for receiving first and second acceleration detection signals from the first and second acceleration detectors 11A and 11B, respectively. The measuring instrument 12 comprises a seismometer unit 12-1, an A/D converter unit 12-2, a communication unit 12-3, and an oscillator unit 12-4. The seismometer unit 12-1 has a low pass filter circuit therein. The seismometer unit 12-1 generates first and second acceleration time-series signals on the basis of the first and second acceleration detection signals, which are analog. The A/D converter unit 12-2 converts the first and second analog acceleration time-series signals from the seismometer unit 12-1 into first and second acceleration time-series signals, which are digital. The A/D converter unit 12-2 has a function to automatically adjusting input sensitivity. The communication unit 12-3 transmits the first and second digital acceleration time-series signals to a device such as a personal computer (hereinbelow, abbreviated to PC) 13 having a monitor 13-1. The PC 13 is connected to the measuring instrument 2. The PC 13 processes signals on the basis of analysis program software, which has previously been installed, to analyze the ground.

According to the present invention, particularly, fast Fourier transform (hereinbelow, abbreviated to FFT) and discrete Fourier transform (hereinbelow, abbreviated to DFT) are used for the signal processing. The FFT and the DFT will be described later.

Figure 3A:
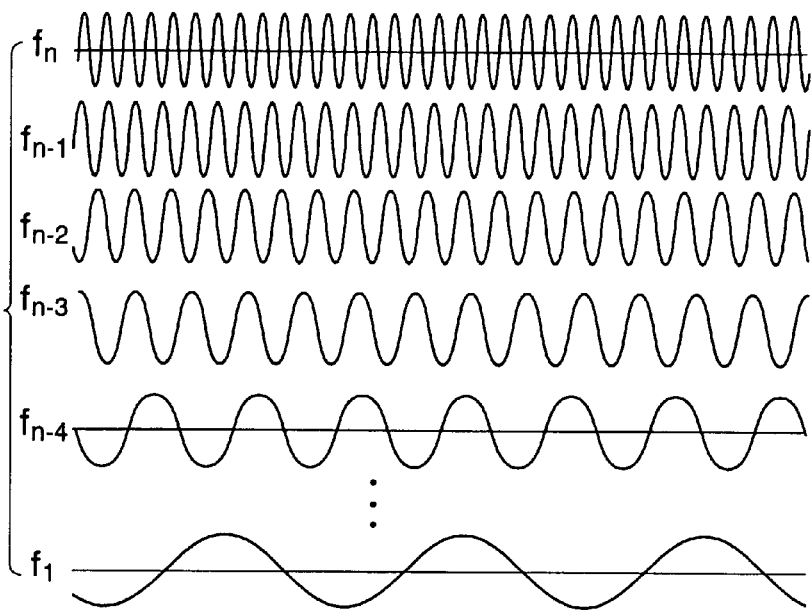
FIGS. 3A to 3C are waveform charts showing examples of sine waves, multi-sine waves, and swept sine waves used in case of multi-sine measurement in the ground analyzing system according to the present invention.
Figure 3B:
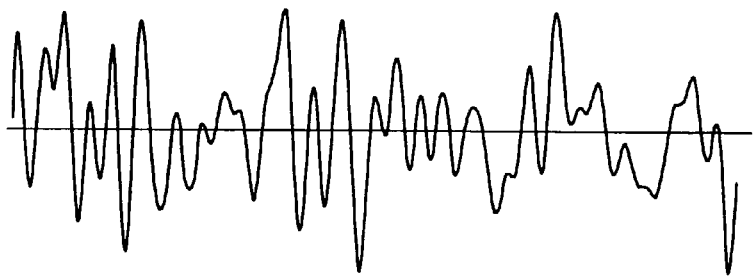
Figure 3C:
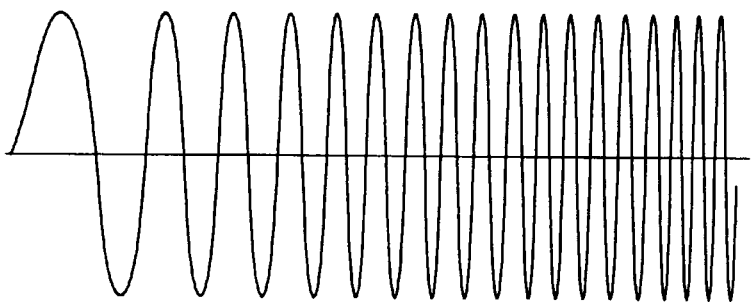

The oscillator unit 12-4 generates an excitation signal to be supplied to a vibration exciter 15. The excitation signal is amplified by a power amplifier 14 and the amplified signal is supplied to the vibration exciter 15. The oscillator unit 12-4 can generate a sine-wave signal, a multi-sine signal, and a swept sine signal as the excitation signals. The oscillator unit 12-4 can generate various kinds of sine-wave signals having different frequencies. The multi-sine signal is obtained by synthesizing sine-wave signals having different frequencies $f_1$ to $f_n$ as shown in FIG. 3A so as to have various amplitudes. For example, the multi-sine signal has a synthesized wave as shown in FIG. 3B. On the other hand, the swept sine signal is obtained by synthesizing the sine-wave signals having the different frequencies $f_1$ to $f_n$ so as to have a constant amplitude. For example, the swept sine signal has a synthesized wave as shown in FIG. 3C. The swept sine signal has a so-called frequency modulation wave. FIGS. 3B and 3C show the synthesized waveforms for the sake of convenience and do not illustrate the actual synthesized waveforms of the sine-wave signals in FIG. 3A.

As will be clarified in the after-mentioned description, according to the present embodiment, when the sine-wave signal is used as the excitation signal, the signal processing is performed through the above-mentioned DFT. Hereinbelow, this processing is called a step sine measurement. On the other hand, when the multi-sine signal or the swept sine signal is used as the excitation signal, the signal processing is performed through the above-mentioned FFT. Hereinbelow, this processing is called a multi-sine measurement. In case of the FFT, a frequency denotes a fixed value determined by $2^n$ and a step width is also fixed. Furthermore, it is necessary to change a set frequency from a low level to a high level. On the other hand, in case of the DFT, a frequency can arbitrarily be set. A set frequency can be changed in both the direction from the low level to the high level and the direction from the high level to the low level.

The operation will now be described hereinbelow. First, the vibration exciter 15 and the first and second acceleration detectors 11A and 11B are disposed on a straight line in an area to be analyzed. It is assumed that the distance between the first and second acceleration detectors 11A and 11B is set to L(m). The surface of the ground is vibrated in the vertical direction using the vibration exciter 15, whereby surface waves are generated around the vibration exciter 15. The first and second acceleration detectors 11A and 11B detect the vertical vibration of the surface waves (Rayleigh waves) propagated in the vicinity of the surface of the ground. The first and second acceleration detection signals from the first and second acceleration detectors 11A and 11B are allowed to pass through the low pass filter circuit in the seismometer unit 12-1, resulting in first and second acceleration time-series signals A(t) and B(t) which are analog. The resultant signals are supplied to the A/D converter unit 12-2. The A/D converter unit 12-2 converts the analog signals into first and second acceleration time-series signals Ad(t) and Bd(t) which are digital. The digital signals are transferred from the communication unit 12-3 to the PC 13.

On the basis of a predetermined analysis program, the PC 13 calculates power spectra $G_{AA}(f)$ and $G_{BB}(f)$ of the first and second acceleration time-series signals Ad(t) and Bd(t), a cross spectrum $G_{BA}(f)$, a transfer function H(f), and a coherence function $\gamma^2(f)$. The calculated power spectra $G_{AA}(f)$ and $G_{BB}(f)$, the cross spectrum $G_{BA}(f)$, the transfer function H(f), and the coherence function $\gamma^2(f)$ are stored into a hard disk built in the PC 13. The PC 13 also obtains a phase difference $\Delta\theta(f)$ between the first and second acceleration time-series signals Ad(t) and Bd(t) using the transfer function H(f). Subsequently, the PC 13 obtains a time difference $\Delta t(f)$ therebetween. The PC 13 further obtains a mean propagation velocity $V_r(f)$ of the surface wave and a depth D(f) on the basis of the time difference $\Delta t(f)$ and the distance L between the first and second acceleration detectors 11A and 11B. The PC 13 displays a D versus $V_r$ dispersion curve on the monitor 13-1 on the basis of the obtained mean propagation velocity $V_r(f)$ and the depth D(f).

Figure 4:
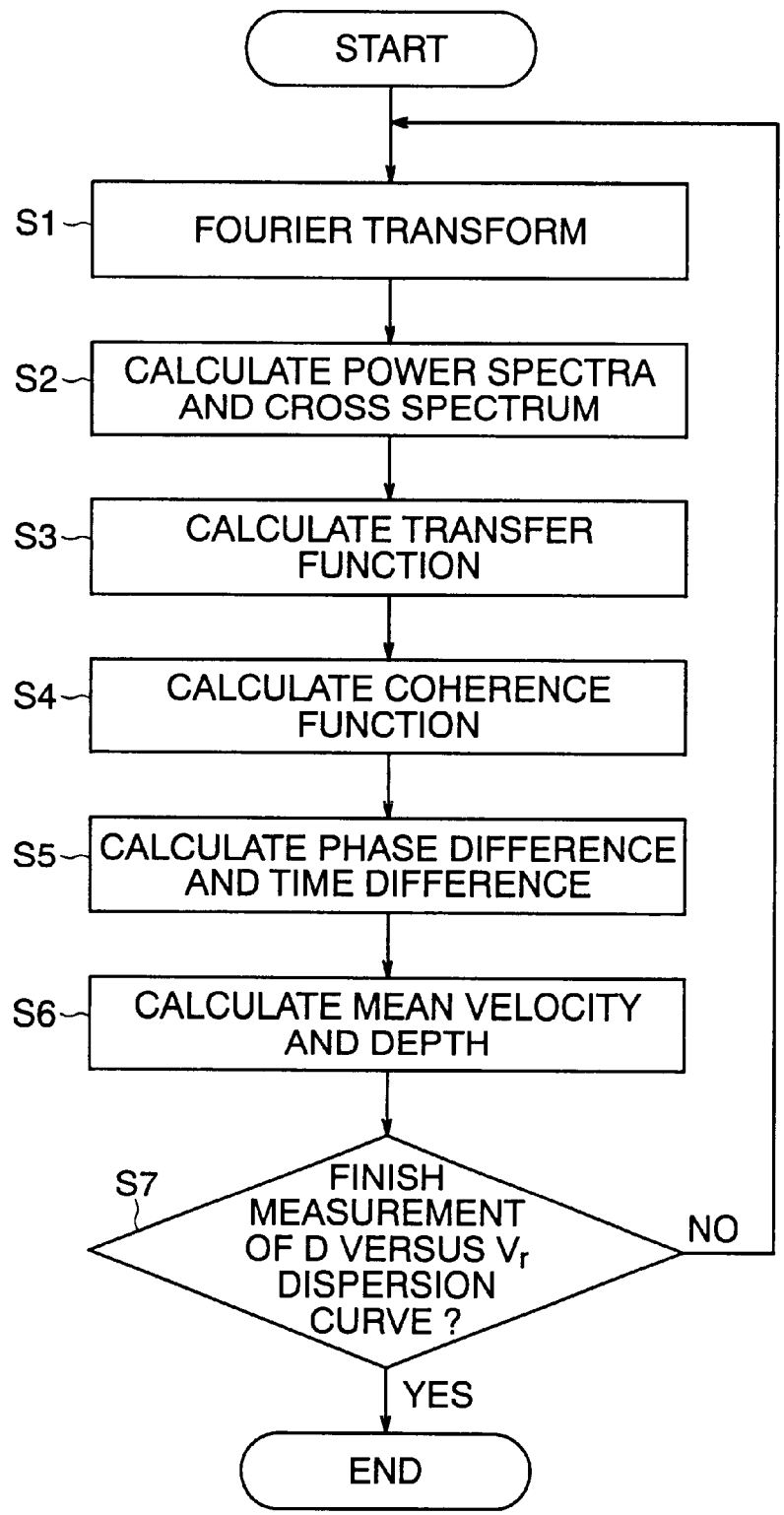
FIG. 4 is a flowchart explaining the operation of an analysis program used in the ground analyzing system according to the present invention.

Also referring to FIG. 4, an explanation will be made in more detail with respect to the method for calculating the mean propagation velocity $V_r(f)$ of the surface wave and the depth $D(f)$ on the basis of the analysis program in the PC 13.

In step S1, the PC 13 performs the Fourier transform expressed by the following equations (1) and (2) to the first and second A/D converted acceleration time-series signals Ad(t) and Bd(t), thereby obtaining transformed signals $S_A(f)$ and $S_B(f)$. In step S2, the power spectra $G_{AA}(f)$ and $G_{BB}(f)$ and the cross spectrum $G_{BA}(f)$ are calculated on the basis of the transformed signals $S_A(f)$ and $S_B(f)$ by the following equations (3), (4), and (5).

$$S_A(f) = \int_{-\infty}^{\infty} A(t) \cdot e^{-j2\pi ft} dt \tag{1}$$

$$S_B(f) = \int_{-\infty}^{\infty} B(t) \cdot e^{-j2\pi ft} dt \tag{2}$$

$$G_{AA}(f) = S_A(f) \cdot S_A^*(f) \tag{3}$$

$$G_{BB}(f) = S_B(f) \cdot S_B^*(f) \tag{4}$$

$$G_{BA}(f) = S_B(f) \cdot S_A^*(f) \tag{5}$$

Subsequently, in steps S3 and S4, on the basis of the above spectra, the transfer function $H(f)$ is calculated by the following equation (6) and the coherence function $\gamma^2(f)$ is calculated by the following equation (7). The calculated functions are stored into the hard disk built in the PC 13.

$$H(f) = \frac{S_B(f)}{S_A(f)} = \frac{S_B(f) \cdot S_A^*(f)}{S_A(f) \cdot S_A^*(f)} = \frac{G_{BA}(f)}{G_{AA}(f)} \tag{6}$$

$$\gamma^2(f) = \frac{|G_{BA}(f)|^2}{G_{AA}(f) \cdot G_{BB}(f)} \tag{7}$$

The coherence function $\gamma^2(f)$ is calculated in order to observe an influence exerted by disturbance noises. In other words, the coherence function $\gamma^2(f)$ has a value within a range of 0 to 1. As the disturbance noise level is higher, the value of the coherence function is closer to 0. A threshold value of the coherence function $\gamma^2(f)$ is set. When the calculated value of the coherence function $\gamma^2(f)$ is smaller than the threshold value, the calculated transfer function $H(f)$ is not used.

Subsequently, in step S5, the phase difference $\Delta\theta(f)$ between the two signals is obtained using a real component Re(H(f)) and an imaginary component Im(H(f)) of the transfer function $H(f)$ by the following equation (8). Further, the obtained phase difference $\Delta\theta(f)$ is transformed into the time difference $\Delta t(f)$ between the two signals by the following equation (9).

$$\Delta\theta(f) = \arctan\left[\frac{\text{Im}(H(f))}{\text{Re}(H(f))}\right] \tag{8}$$

$$\Delta t(f) = \frac{\Delta\theta(f)}{2\pi f} \tag{9}$$

In step S6, the mean propagation velocity $V_r$ (m/sec) and the depth D (m) are calculated using the time difference $\Delta t(f)$ and the distance L by the following equations (10) and (11).

$$V_r = \frac{L}{\Delta t(f)} = \frac{2\pi fL}{-\Delta\theta(f)} \tag{10}$$

$$D = \frac{\lambda}{2} = \frac{V_r}{2f} = \frac{\pi L}{-\Delta\theta(f)} \tag{11}$$

In the above equations, reference symbol * denotes a complex conjugate.

The above calculating steps are repeated until the desired D versus $V_r$ curve is obtained (step S7). In other words, the frequency of the excitation signal to be supplied to the vibration exciter 15 is changed each time the measurement is performed once. That is, the phase difference in the transfer function $H(f)$ is measured every frequency. The phase difference is the reciprocal of the propagation velocity of the surface wave. Subsequently, the mean velocity $V_r$ and the depth D are calculated on the basis of the relationship between the phase difference and the frequency. As the result obtained by repeating the measurement, the D versus $V_r$ dispersion curve is displayed on the monitor 13-1.

Figure 5:
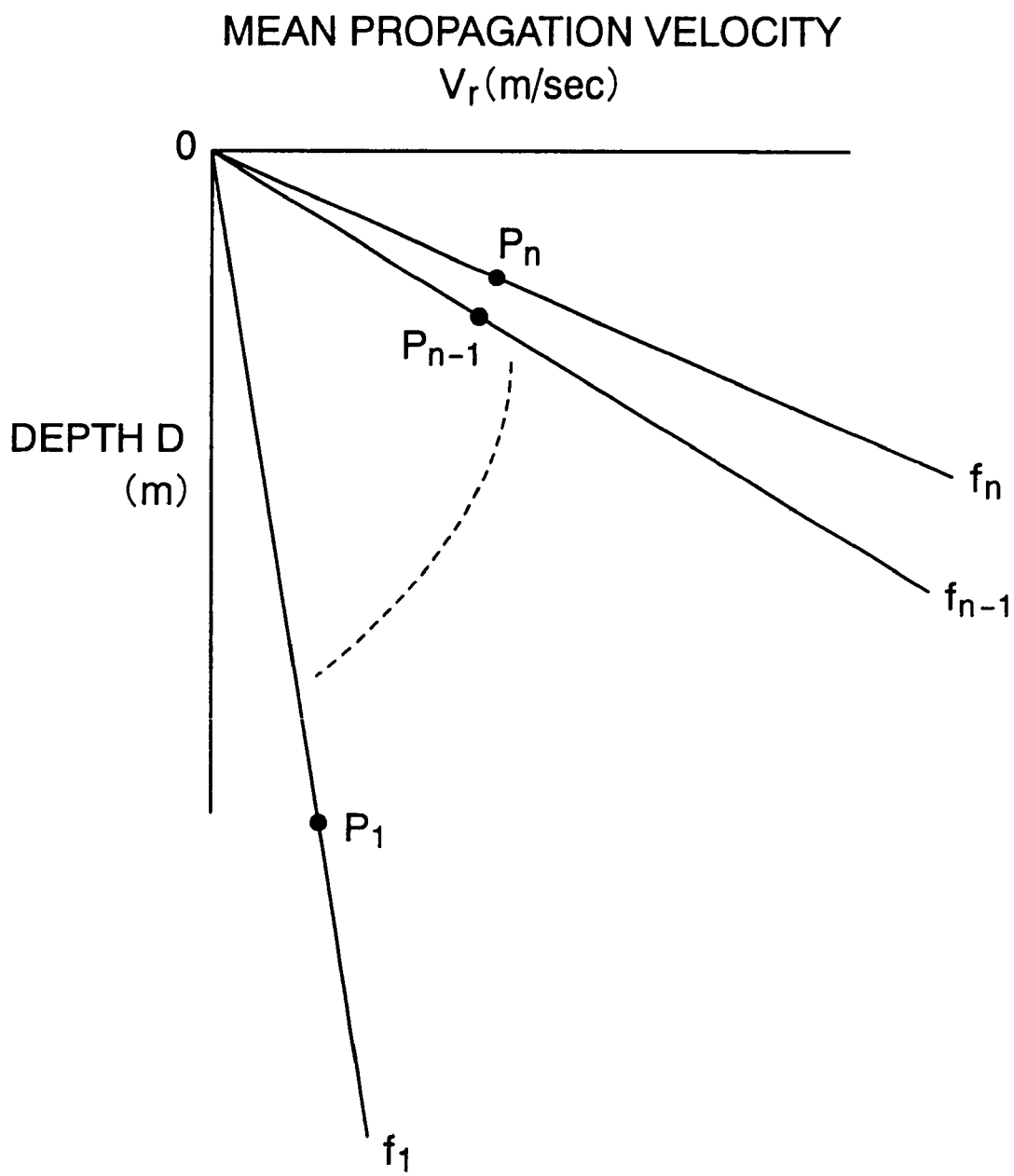
FIG. 5 is a graph explaining a drawing procedure of a D versus $V_r$ dispersion curve in step sine measurement of the present invention.

Particularly, in case of the step sine measurement, a value $P_n$ is determined on the basis of a mean propagation velocity $V_r(f_n)$ and a depth $D(f_n)$, which are obtained by supplying an excitation signal having the frequency $f_n$ (refer to FIG. 3A) to the vibration exciter 15. The value $P_n$ is plotted on a D versus $V_r$ plane. Subsequently, a value $P_{n-1}$ is determined on the basis of a mean propagation velocity $V_r(f_{n-1})$ and a depth $D(f_{n-1})$, which are obtained by supplying an excitation signal of the frequency $f_{n-1}$ (refer to FIG. 3A) to the vibration exciter 15. The value $P_{n-1}$ is plotted on the D versus $V_r$ plane. Such a processing is repeated. Finally, a value $P_1$ is determined on the basis of a mean propagation velocity $V_r(f_1)$ and a depth $D(f_1)$, which are obtained by supplying an excitation signal having the frequency $f_1$ (refer to FIG. 3A) to the vibration exciter 15. The value $P_1$ is plotted on the D versus $V_r$ plane. Consequently, the D versus $V_r$ dispersion curve is obtained as shown in FIG. 5.

On the other hand, in case of the multi-sine measurement, when the multi-sine signal as shown in FIG. 3B or the swept sine signal as shown in FIG. 3C is supplied to the vibration exciter 15, the first and second acceleration time-series signals Ad(t) and Bd(t) caused by the vibration due to the synthesized wave are obtained. The acceleration time-series signals include the frequency components as shown in FIG. 3A. The frequency components are separated and extracted through the FFT. The extracted frequency components are subjected to the above-mentioned processing, so that the values $P_n$ to $P_1$ as shown in FIG. 5 are obtained simultaneously.

As obviously understood from the above description, in the multi-sine measurement, short measurement processing time is required to obtain the D versus $V_r$ dispersion curve. However, since the synthesized wave is used, the energy of the vibration is attenuated, so that the multi-sine measurement is very susceptible to noises. When the swept sine signal as shown in FIG. 3C is supplied to the vibration exciter, a stone or another matter existing in the ground may cause a resonance. It is preferable to perform the measurement while switching between the swept sine signal and the multi-sine signal.

Figure 6A:
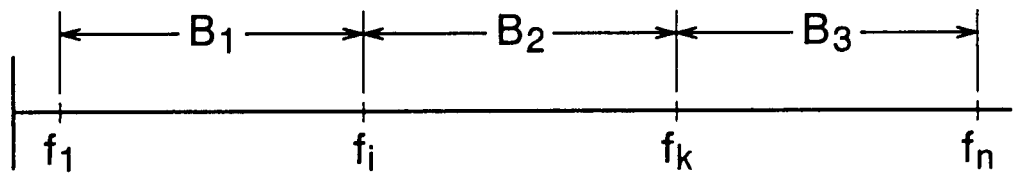
FIGS. 6A and 6B are diagrams explaining the operation in case of dividing a frequency band into three bands to obtain the D versus $V_r$ dispersion curve in the multi-sine measurement of the present invention.
Figure 6B:
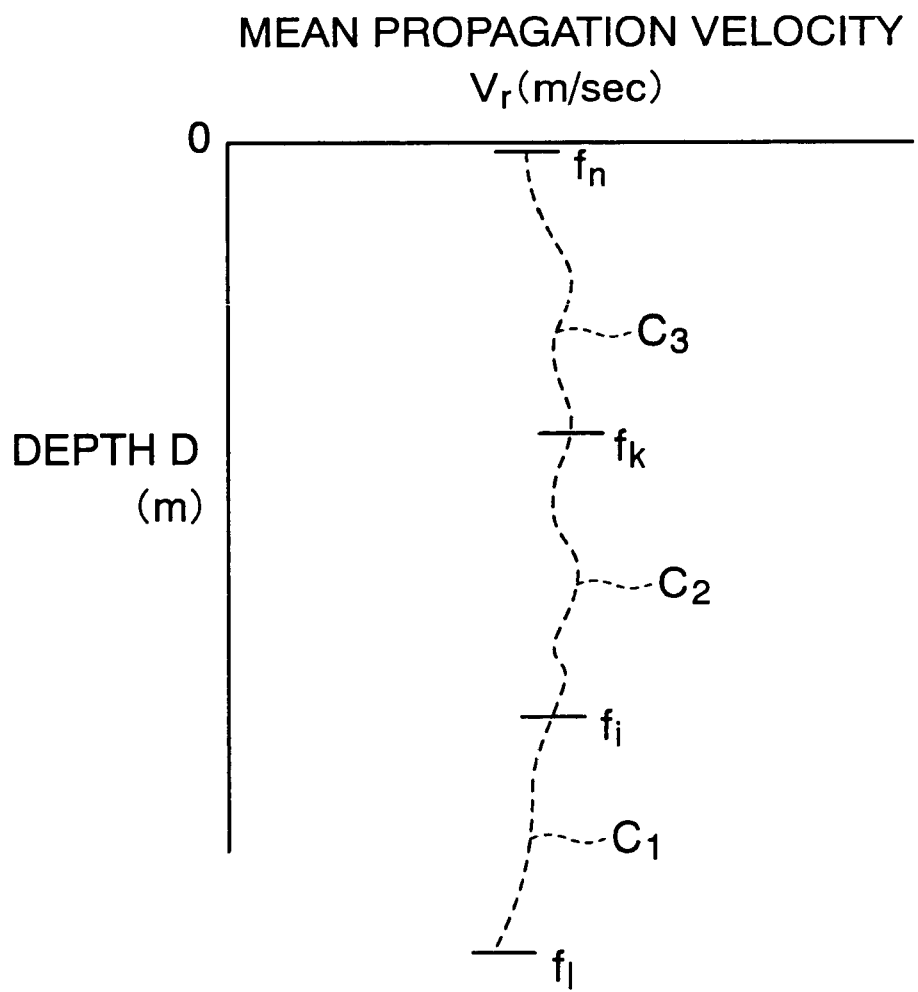

The problem regarding the attenuation in vibration energy can be solved as follows. That is, a frequency band including the frequencies $f_1$ to $f_n$ is divided into three bands of a band $B_1$ ($f_1$ to $f_i$), a band $B_2$ ($f_i$ to $f_k$), and a band $B_3$ ($f_k$ to $f_n$) as shown in FIG. 6A. In each band, the multi-sine measurement is performed using the synthesized wave. In this case, as shown in FIG. 6B, a curve $C_1$ is obtained by the measurement of the band $B_1$, a curve $C_2$ is obtained by the measurement of the band $B_2$, and a curve $C_3$ is obtained by the measurement of the band $B_3$ on the D versus $V_r$ plane. The curves $C_1$ to $C_3$ are automatically combined and then displayed. The reason why the above measurement is performed is that the vibration energy becomes larger as the number of frequency signals to be synthesized is smaller. For the number of bands, two bands can be used.

Figure 7:
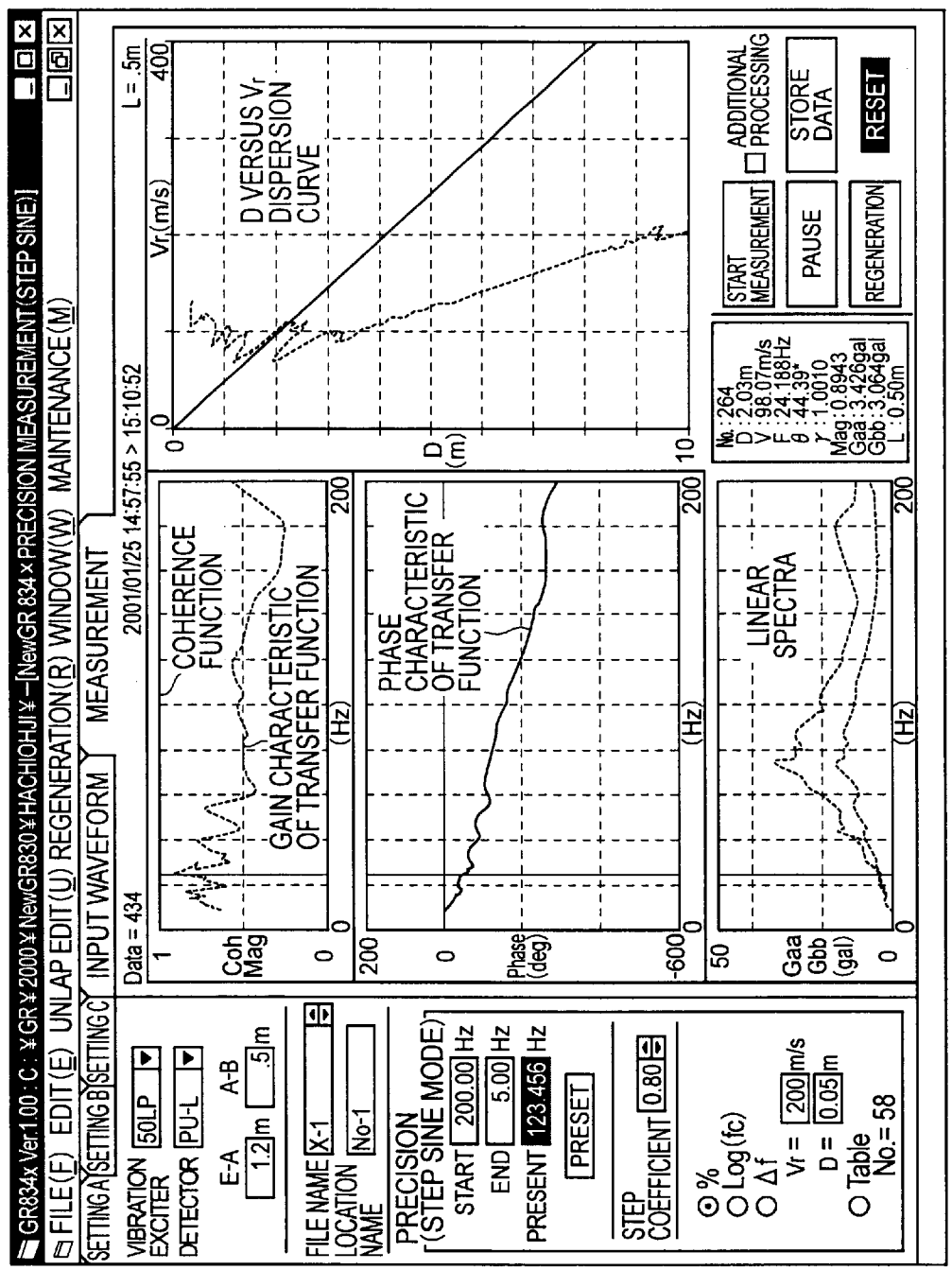
FIG. 7 is a diagram showing an example of a display screen displayed on a monitor in the ground analyzing system according to the present invention, the example regarding the step sine measurement.
Figure 8:
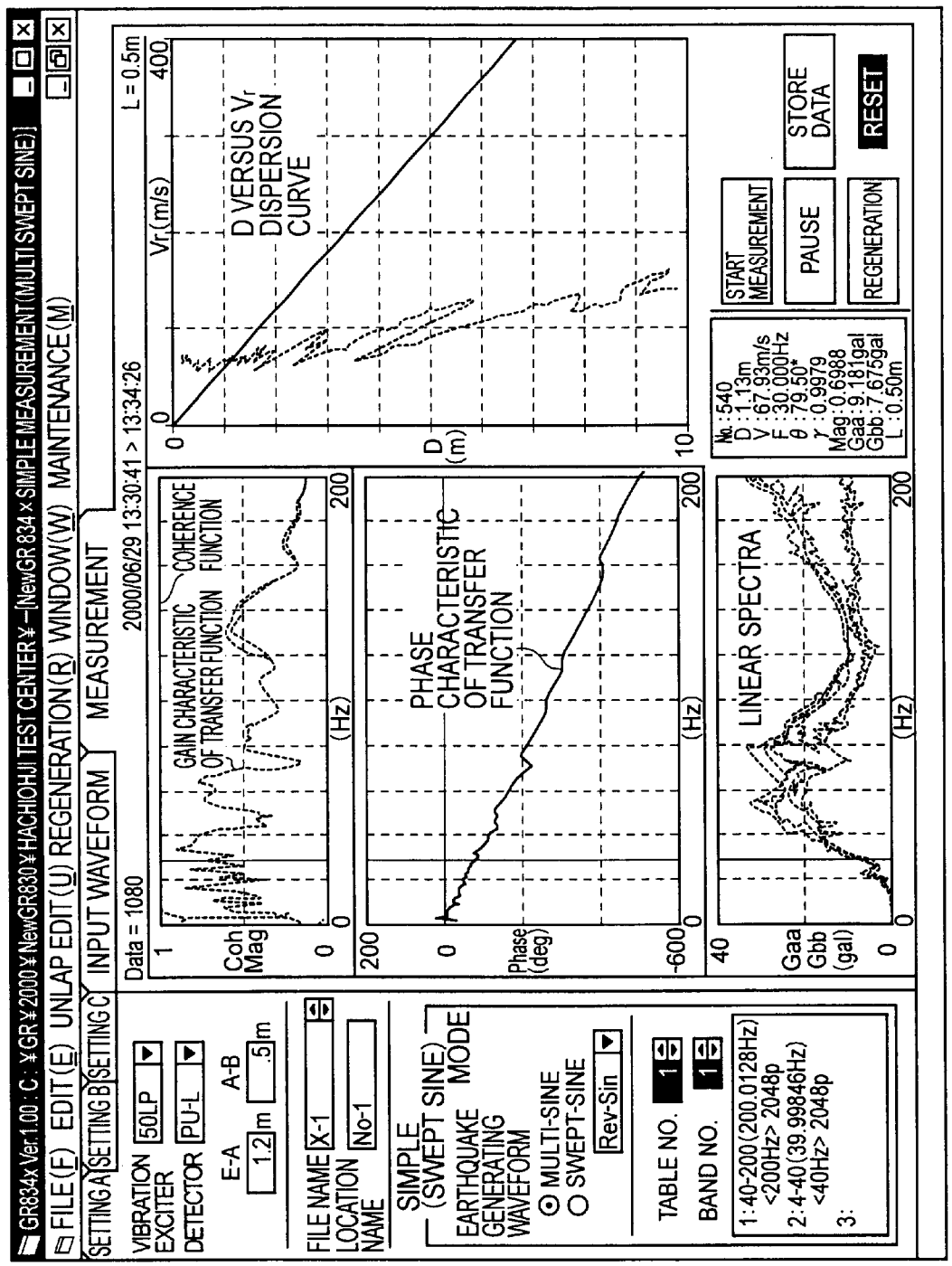
FIG. 8 is a diagram showing an example of the display screen displayed on the monitor in the ground analyzing system according to the present invention, the example regarding the multi-sine measurement.

FIGS. 7 and 8 illustrate display examples of the monitor 13-1 in case of the step sine measurement and the multi-sine measurement, respectively. In each example, in addition to the D versus $V_r$ dispersion curve, the coherence function $\gamma^2(f)$, the gain characteristic of the transfer function H(f), the phase characteristic of the transfer function H(f), and linear spectra are displayed in a multiscreen manner. In FIGS. 7 and 8, as the coherence function $\gamma^2(f)$, a value approximate to 1 is plotted. Accordingly, it is hard to find the coherence function $\gamma^2(f)$. The linear spectrum denotes the square root of the power spectrum. It is considered that the linear spectrum is more visible than the power spectrum in the display screen.

A comparison between the step sine measurement and the multi-sine measurement will now be described.

In the step sine measurement, as mentioned above, the sine wave is used as the excitation signal for the vibration exciter 15. The DFT is used in the analysis according to the analysis program. The characteristics of the step sine measurement are as follows.

A. When the DFT is used, the measurement can be performed using an arbitrary sine-wave frequency. In other words, there is no limitation in frequency band and resolution, so that an arbitrary oscillation frequency can be set. When there is no limitation in setting of the frequency, the arbitrary oscillation frequency is set and data can be acquired. Accordingly, while observing the D versus $V_r$ dispersion curve displayed on the monitor 13-1, the user adds and sets a frequency with respect to a curve area where the measured values are sparsely plotted. Consequently, the additional measurement can be easily performed.

B. The analysis can be performed from a shallow depth to a deep depth. That is, while observing the D versus $V_r$ dispersion curve, the user analyzes the ground from the shallow depth to the deep depth, so that he or she finishes the measurement at a target analysis depth. The reason is that the measurement (step sine measurement) can be performed while sweeping the frequency in both of the direction from the low level to the high level and the direction from the high level to the low level. Accordingly, the measurement is performed while sweeping the frequency from the high level to the low level, thereby enabling to perform the measurement in the direction from the shallow depth to the deep depth.

C. It is possible to measure using the same frequency as that measured before. In other words, it is possible to simplify the setting of the frequency at a point in the same stratum structure. The reason is that the setting sequence of the frequencies measured before can be stored as a file list in the hard disk of the PC 13. On the basis of the stored frequency list, the measurement can be performed in accordance with the same setting sequence of the frequencies as that used in the previous measurement.

D. The measurement of an automatic input range can be made. In other words, it is possible to save time to change the input range. The reason is that the A/D converter unit 12-2 has the function to automatically adjusting the input sensitivity in the present embodiment. The A/D converter unit 12-2 monitors an input level with respect to the predetermined upper and lower limits and automatically performs the following operation. Namely, when the input level denotes the lower limit or less, the input sensitivity is raised, and when the input level exceeds the upper limit, the input sensitivity is lowered. Consequently, the measurement can be made at the optimum input level. Such a measurement is not fit for a location with a large fluctuation in external noise level. Measurement time may extend. In such a case, the range is switched to a manual range.

E. The measured values are automatically transformed to display the D versus $V_r$ dispersion curve. In other words, it is unnecessary to transform a transfer-function versus phase-difference curve into a D versus $V_r$ dispersion curve each time. Consequently, the labor is saved. Further, as shown in FIG. 7, the D versus $V_r$ dispersion curve as the final result can be observed in real time. The reason is that the D versus $V_r$ dispersion curve is automatically displayed due to transformation each time data is updated in the present embodiment.

F. The vibration level at a measurement point can be shown by acceleration (Gal). In other words, as shown in the right lower area of the screen in FIG. 7, numerical values of real levels can be read. Referring to FIG. 7, a power spectrum Gaa: 3.426 and a power spectrum Gbb: 3.064 are shown. The power spectrum Gaa is obtained by the first acceleration detector 11A disposed close to the vibration exciter 15 shown in FIG. 2. The power spectrum Gbb is obtained by the second acceleration detector 11B disposed far away from the vibration exciter 15.

G: The measurement can be made in short time. In other words, since the frequency band and the resolution are not limited, data can efficiently be collected. Consequently, the measurement time can be reduced. The reason is as follows. Since the DFT is used in the present embodiment, the signal processing can be performed by setting an arbitrary frequency. Accordingly, it is unnecessary to collect similar approximate data several times, so that the measurement time may be reduced.

H. Most of measurement points can be measured by the step sine measurement alone.

On the other hand, in the multi-sine measurement, as mentioned above, the multi-sine wave or the swept sine wave is used as the excitation signal for the vibration exciter 15 and the FFT is used for the analysis according to the analysis program. The characteristics of the multi-sine measurement are as follows.

a. As described in FIGS. 6A and 6B, the measurements in the three bands at the maximum can be automatically combined. Accordingly, it is possible to omit the operation to combine the D versus $V_r$ curves after measurement. The reason is that the system according to the present embodiment has a function to automatically combine measurement data of the three bands at the maximum and then display the combined data. The frequency resolution per band denotes 800 points. Consequently, the finer D versus $V_r$ dispersion curve can be measured and the measurement can be realized with higher precision.

b. A frequency range is limited and the multi-sine wave can be generated as a periodic random signal. Accordingly, the band range is limited, whereby the ability of the vibration exciter can be raised. The reason is as follows. Since the frequency range can be limited in the present embodiment, the individual frequency spectrum value is raised, so that the periodic random signal can be generated.

c. It is possible to easily switch between the multi-sine wave and the swept sine wave.

d. The measured values can be automatically transformed to display the D versus $V_r$ dispersion curve in the same way as the step sine measurement.

e. The vibration level at a measurement point can be shown by the acceleration (Gal) in the same way as the step sine measurement.

What is claimed is:

1. A ground analyzing system for carrying out ground analysis by detecting surface waves generated by vibrating the surface of the ground in the vertical direction, said system comprising:

first and second acceleration detectors disposed at a distance L from each other on the ground;

a measuring instrument including a seismometer unit for receiving detection signals from the first and second acceleration detectors to generate first and second acceleration time-series signals; and a signal processing unit for receiving the first and second acceleration time-series signals to perform a signal processing based on a predetermined analysis program, wherein the signal processing unit performs Fourier transform to calculate power spectra and a cross spectrum, calculates a transfer function H(f) using the calculated power spectra and cross spectrum, calculates a phase difference $\Delta\theta(f)$ between the first and second acceleration time-series signals and a time difference $\Delta t(f)$ therebetween using the calculated transfer function H(f), and further, calculates a mean propagation velocity $V_r(f)$ of the surface waves and a depth D(f) on the basis of the calculated time difference $\Delta t(f)$ and the distance L.

2. A ground analyzing system according to claim 1, wherein the measuring instrument further includes an oscillator unit for generating an excitation signal to be supplied to a vibration exciter for vibrating the ground, and the excitation signal is amplified by a power amplifier and is then supplied to the vibration exciter.

3. A ground analyzing system according to claim 2, wherein the oscillator unit can generate a step sine wave, or generate a multi-sine wave or a swept sine wave so as to switch between the multi-sine wave and the swept sine wave as the excitation signal, and the step sine wave is defined by various kinds of sine waves having different frequencies, the multi-sine wave is defined by a synthesized wave obtained by synthesizing various kinds of sine waves having different frequencies, and the swept sine wave is defined by a synthesized wave obtained by synthesizing various kinds of sine waves having different frequency so as to have a constant amplitude.

4. A ground analyzing system according to claim 3, wherein the signal processing unit repeats the processing of calculating the mean propagation velocity $V_r(f)$ and the depth D(f) to generate a depth D versus mean-propagation-velocity $V_r$ curve.

5. A ground analyzing system according to claim 4, wherein the measuring instrument further includes an A/D converter unit for converting the first and second acceleration time-series signals which are analog from the seismometer unit into first and second acceleration time-series signals which are digital and then generating the converted signals, and the A/D converter unit has a function to automatically adjust input sensitivity according to an input level.

6. A ground analyzing system according to claim 3, wherein when the step sine wave is used as the excitation signal, the signal processing unit performs a processing according to discrete Fourier transform and, when the multi-sine wave or the swept sine wave is used as the excitation signal, the signal processing unit performs a processing according to fast Fourier transform.

7. A recording medium which has recorded an analysis program for processing first and second acceleration time-series signals obtained by detecting surface waves, generated by vibrating the surface of the ground in the vertical direction, at two points arranged at a distance L from each other, the analysis program being for executing the steps of:

performing Fourier transform to the first and second acceleration time-series signals to calculate power spectra and a cross spectrum;

calculating a transfer function H(f) using the calculated power spectrum and cross spectrum;

calculating a phase difference $\Delta\theta(f)$ between the first and second acceleration time-series signals and a time difference $\Delta t(f)$ therebetween on the basis of the calculated transfer function H(f); and calculating a mean propagation velocity $V_r(f)$ of the surface waves and a depth D(f) on the basis of the calculated time difference $\Delta t(f)$ and the distance L.

8. A recording medium according to claim 7, wherein the analysis program further includes a step of repeating the step of calculating the mean propagation velocity $V_r(f)$ and the depth D(f) to form a depth D versus mean-propagation-velocity $V_r$ curve.

* * * * *